United States Patent
Ahn et al.

(10) Patent No.: US 10,841,915 B2
(45) Date of Patent: Nov. 17, 2020

(54) METHOD AND DEVICE FOR MONITORING CONTROL CHANNEL

(71) Applicant: LG ELECTRONICS INC., Seoul (KR)

(72) Inventors: Joonkui Ahn, Seoul (KR); Hanbyul Seo, Seoul (KR); Yunjung Yi, Seoul (KR); Hanjun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/307,887

(22) PCT Filed: Jun. 22, 2017

(86) PCT No.: PCT/KR2017/006568
§ 371 (c)(1),
(2) Date: Dec. 6, 2018

(87) PCT Pub. No.: WO2017/222316
PCT Pub. Date: Dec. 28, 2017

(65) Prior Publication Data
US 2019/0306839 A1    Oct. 3, 2019

Related U.S. Application Data

(60) Provisional application No. 62/354,086, filed on Jun. 23, 2016.

(51) Int. Cl.
*H04W 72/04* (2009.01)
*H04W 72/14* (2009.01)
*H04J 11/00* (2006.01)

(52) U.S. Cl.
CPC .......... *H04W 72/042* (2013.01); *H04J 11/00* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 10,506,600 B2 * | 12/2019 | Webb | H04W 72/042 |
| 2011/0076962 A1 * | 3/2011 | Chen | H04L 5/001 |
| | | | 455/68 |

(Continued)

FOREIGN PATENT DOCUMENTS

| | | |
|---|---|---|
| CN | 101946423 | 1/2011 |
| KR | 1020110134305 | 12/2011 |

(Continued)

OTHER PUBLICATIONS

PCT International Application No. PCT/KR2017/006568, International Search Report dated Sep. 21, 2017, 4 pages.

(Continued)

*Primary Examiner* — Michael J Moore, Jr.
(74) *Attorney, Agent, or Firm* — Lee Hong Degerman Kang Waimey

(57) ABSTRACT

Provided is a method and device for monitoring a control channel in a wireless communication system. The device determines a search space for detecting a physical downlink control channel (PDCCH) on the basis of a long device identifier. The device monitors the PDCCH in the search space on the basis of a short device identifier.

11 Claims, 7 Drawing Sheets

(56) References Cited

U.S. PATENT DOCUMENTS

| | | | |
|---|---|---|---|
| 2011/0223924 A1* | 9/2011 | Lohr | H04W 72/1289 455/450 |
| 2013/0003663 A1* | 1/2013 | Blankenship | H04L 1/0004 370/329 |
| 2013/0182654 A1* | 7/2013 | Hariharan | H04W 52/54 370/329 |
| 2014/0177449 A1 | 6/2014 | Novak et al. | |
| 2016/0014752 A1* | 1/2016 | Papasakellariou | H04W 72/0446 370/329 |
| 2016/0150508 A1 | 5/2016 | Golitschek Edler von Elbwart et al. | |
| 2019/0014562 A1* | 1/2019 | Yasukawa | H04W 28/06 |
| 2019/0029008 A1 | 1/2019 | Lee et al. | |
| 2019/0089498 A1* | 3/2019 | Pelletier | H04W 72/005 |
| 2019/0141679 A1* | 5/2019 | He | H04L 5/0053 |

FOREIGN PATENT DOCUMENTS

| | | |
|---|---|---|
| KR | 1020120068968 | 6/2012 |
| KR | 1020130007642 | 1/2013 |
| KR | 101540869 | 7/2015 |
| KR | 1020150093155 | 8/2015 |

OTHER PUBLICATIONS

European Patent Office Application Serial No. 17815729.3, Search Report dated Dec. 17, 2019, 9 pages.

* cited by examiner

METHOD AND DEVICE FOR MONITORING CONTROL CHANNEL

CROSS-REFERENCE TO RELATED APPLICATIONS

[0] This application is the National Stage filing under 35 U.S.C. 371 of International Application No. PCT/KR2017/006568, filed on Jun. 22, 2017, which claims the benefit of U.S. Provisional Application No. 62/354,086, filed on Jun. 23, 2016, the contents of which are all hereby incorporated by reference herein in their entirety.

BACKGROUND OF THE INVENTION

Field of the Invention

The present invention relates to wireless communication, and more particularly, to a method of monitoring a control channel in a wireless communication system, and a device using the method.

Related Art

A next-generation wireless communication system is required to support various user environments and greater communication capacity. Representative issues considered in the next-generation system include a massive machine type communications (MTC) which provides various services anytime anywhere by connecting a plurality of devices, ultra-reliable and low-latency communications (URLLC) considering a service which is sensitive to reliability and latency, or the like.

It is considered to deploy a plurality of base stations in a narrow region in order to increase data transfer efficiency. Since a user equipment (UE) can move between the plurality of base stations for a relatively short period of time according to mobility of the UEs, rapid switching between the base stations is required.

SUMMARY OF THE INVENTION

The present invention provides a method for monitoring a control channel in a wireless communication system and a device using the same.

In an aspect, a method for monitoring a control channel in a wireless communication system includes determining, by a wireless device, a search space for detecting a physical downlink control channel (PDCCH) based on a long device identifier, and monitoring, by the wireless device, the PDCCH in the search space based on a short device identifier. The long device identifier includes the short device identifier.

The number of bits of the long device identifier may be greater than the number of bits of the short device identifier.

In another aspect, a device for monitoring a control channel in a wireless communication system includes a transceiver configured to transmit and receive a radio signal, and a processor operatively coupled to the transceiver. The processor is configured to determine a search space for detecting a physical downlink control channel (PDCCH) based on a long device identifier, and monitor the PDCCH in the search space through the transceiver based on a short device identifier. The long device identifier includes the short device identifier.

A wireless device can rapidly switch a plurality of transmission/reception points (TRPs).

DESCRIPTION OF EXEMPLARY EMBODIMENTS

Figure 1:
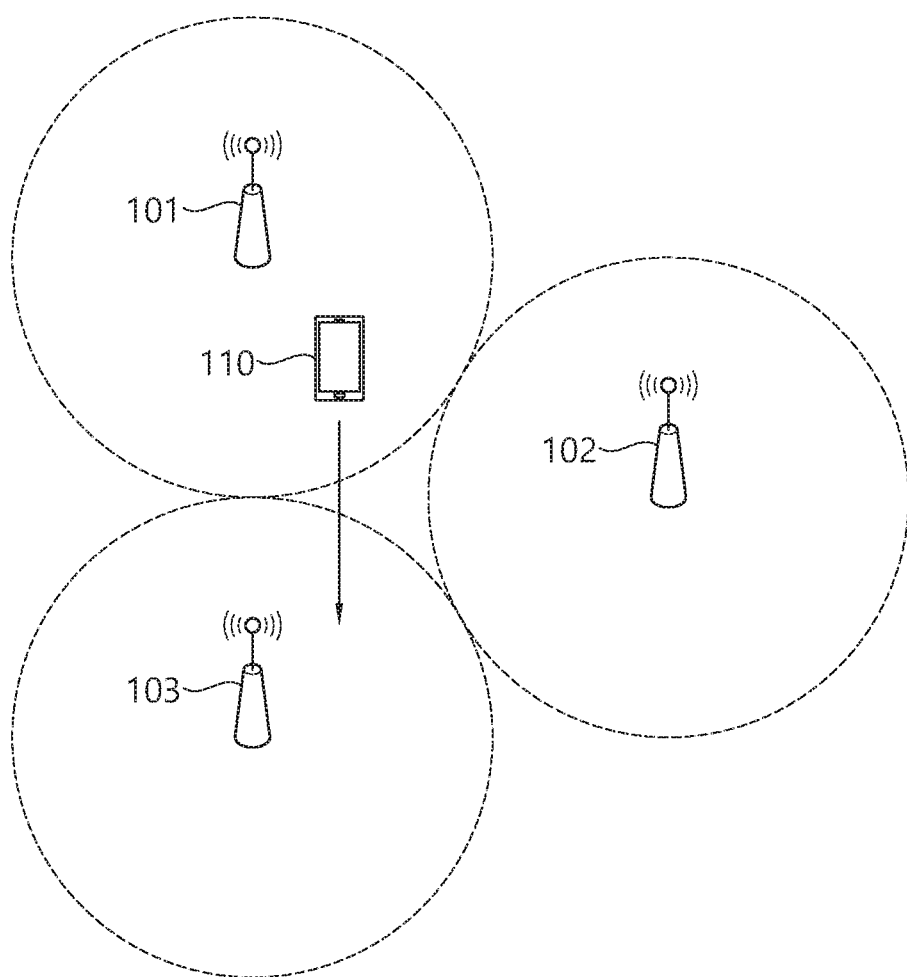
FIG. 1 shows a wireless communication system to which an embodiment of the present invention is applied.

FIG. 1 shows a wireless communication system to which an embodiment of the present invention is applied.

A plurality of transmission/reception points (TRPs) 101, 102, and 103 are deployed. A wireless device 110 is provided with a data transmission/reception service from at least one of the plurality of TRPs 101, 102, and 103.

The wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

The TRP provides a data transmission/reception service for a wireless device in its coverage. The plurality of TRPs may be connected to the same base stations (BS) or different BSs. The TRP may be the BS itself, or may be a remote BS such as a relay. Alternatively, the TRP may be a sector/beam operated by the BS. The TRP may be a cell operated by the BS. Since the TRPs are densely deployed while covering a small region, overall data transmission/reception efficiency can be increased.

The legacy cellular system requires a variety of radio resource control (RRC) signaling between a source BS and the wireless device and between a target BS and the wireless device in order to change a BS to which the wireless device has access. For example, it is required to exchange command/response information for verifying handover completion from a handover start indication, and to transfer system information for the target BS to the wireless device.

However, since many TRPs are deployed in a smaller region, data transfer efficiency may deteriorate when the TRP switching depends on the existing RRC signaling. For example, when the wireless device 110 moves to the target TRP 103 from the source TRP 101 from which a service is currently provided, rapid switching is required between TRPs having a smaller coverage.

Hereinafter, it is described that the present invention is applied according to a $3^{rd}$ generation partnership project (3GPP) long term evolution (LTE) based on 3GPP technical specification (TS). However, this is for exemplary purposes only, and thus the present invention is also applicable to various wireless communication networks.

A physical downlink control channel (PDCCH) which is a control channel used in 3GPP LTE/LTE-A carries downlink control information (DCI). Blind decoding is used for PDCCH detection. The blind decoding is a scheme in which a desired identifier is de-masked from a CRC of a received PDCCH (referred to as a candidate PDCCH) to determine whether the PDCCH is its own control channel by performing CRC error checking. A region in which the PDCCH is monitored in a subframe is called a search space.

An identifier used in 3GPP LTE/LTE-A is as follows.

TABLE 1

| Name | Description |
| --- | --- |
| PLMN (Public Land Mobile Network) ID | Identifier of device in communication network to which subscriber is registered |
| IMSI (International Mobile Subscriber Identity) | Subscriber-specific identifier. 64 bits |
| TMSI (Temporary Mobile Subscriber Identity) | Device-specific identifier in MME ((Mobility Management Entity). 32 bits |
| C-RNTI (Cell Radio Network Temporary Identifier) | Device-specific identifier in a cell. 16 bits |

In particular, C-RNTI is used for various purposes in a physical layer as follows.

To define a search space for a PDCCH having DCI for a corresponding wireless device CRC masking of a PDCCH having DCI for a corresponding wireless device To generate a scrambling sequence for scrambling uplink (UL) data transmitted by the wireless device The C-RNTI may be a parameter which determines a configuration of a physical channel used in a device-specific manner. The C-RNTI is allocated to the wireless device through an RRC message. A new C-RNTI is allocated whenever a BS is changed.

According to an embodiment of the present invention, a scheme of maintaining a device identifier without alteration even if a TRP is changed (in a specific region) is proposed in order to reduce RRC signaling for supporting the TRP switching in an environment where the TRP switching occurs frequently due to mobility of the wireless device.

Figure 2:
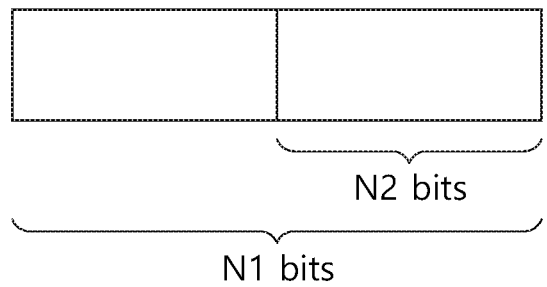
FIG. 2 shows an example of a proposed device identifier.

FIG. 2 shows an example of a proposed device identifier.

A device identifier has N1 bits, and is called a long device identifier (or a first device identifier). Among the long device identifiers, a device identifier having N bits (N2<N1) is called a short device identifier (or a second device identifier). At least any one of the long device identifier and the short device identifier may be directly allocated by a TRP. For example, N2 may be 6, 8, 10, 16, or 20. N1 may be greater by at least 1 than N2.

The short device identifier may be transmitted to the device by being included in medium access control (MAC) signaling or DCI. The long device identifier may be acquired by the wireless device in a predetermined manner. (N1−N2) bits of the long device identifier may be acquired based on the short device identifier, or may be determined from a predetermined bit-stream. For example, if N1=2*N2, the long device identifier may be acquired by repeating the short device identifier one time.

For example, the short device identifier may be used for CRC masking of a PDCCH having DCI for a corresponding wireless device, and the long device identifier may be used for defining of a search space for the PDCCH having the DCI for the corresponding wireless device and for generating of a scrambling sequence. For another example, the short device identifier may be used for CRC masking of a PDCCH having DCI for a corresponding wireless device and for defining of a search space for the PDCCH having the DCI for the corresponding wireless device, and the long device identifier may be used for generating of a scrambling sequence. The scrambling sequence may be used for scrambling of PDCCH/DL data transmitted by the BS and/or scrambling of UL data transmitted by the wireless device.

The long device identifier may be defined as part of an IMSI, a TMSI, and a PLMN ID, and the short device identifier may be defined as part of the long device identifier. The long device identifier may be first allocated, and the short device identifier may be defined based on the long device identifier. Alternatively, the long device identifier and the short device identifier may be defined independently.

Figure 3:
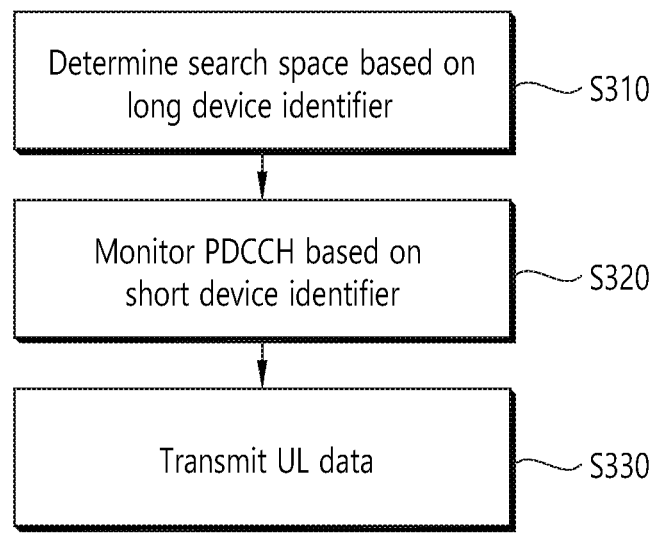
FIG. 3 shows a communication method according to an embodiment of the present invention.

FIG. 3 shows a communication method according to an embodiment of the present invention. In this example, a short device identifier is used for CRC masking of a PDCCH having DCI for a corresponding wireless device, and a long device identifier is used for defining of a search space for the PDCCH having the DCI for the corresponding wireless device and for generating of a scrambling sequence which scrambles UL data transmitted by the wireless device.

The wireless device determines a search space for detecting the PDCCH on the basis of the long device identifier (S310).

The wireless device monitors a PDCCH having a UL grant on the basis of the short device identifier in the search space (S320). If there is no detected error when CRC of the DCI in the PDCCH is de-masked, the PDCCH is recognized as the PDCCH of the wireless device.

The wireless device transmits UL data by using the received UL grant (S330). The UL data is scrambled with a scramble sequence generated based on the long device identifier.

A UE ID is an identifier used as a device identifier by MAC signaling or DCI such as the aforementioned long device identifier or short device identifier. A method of rapidly switching the UE ID is proposed to avoid ID collision between different wireless devices. The UE ID is used as an alternative of the aforementioned C-RNTI.

Figure 4:
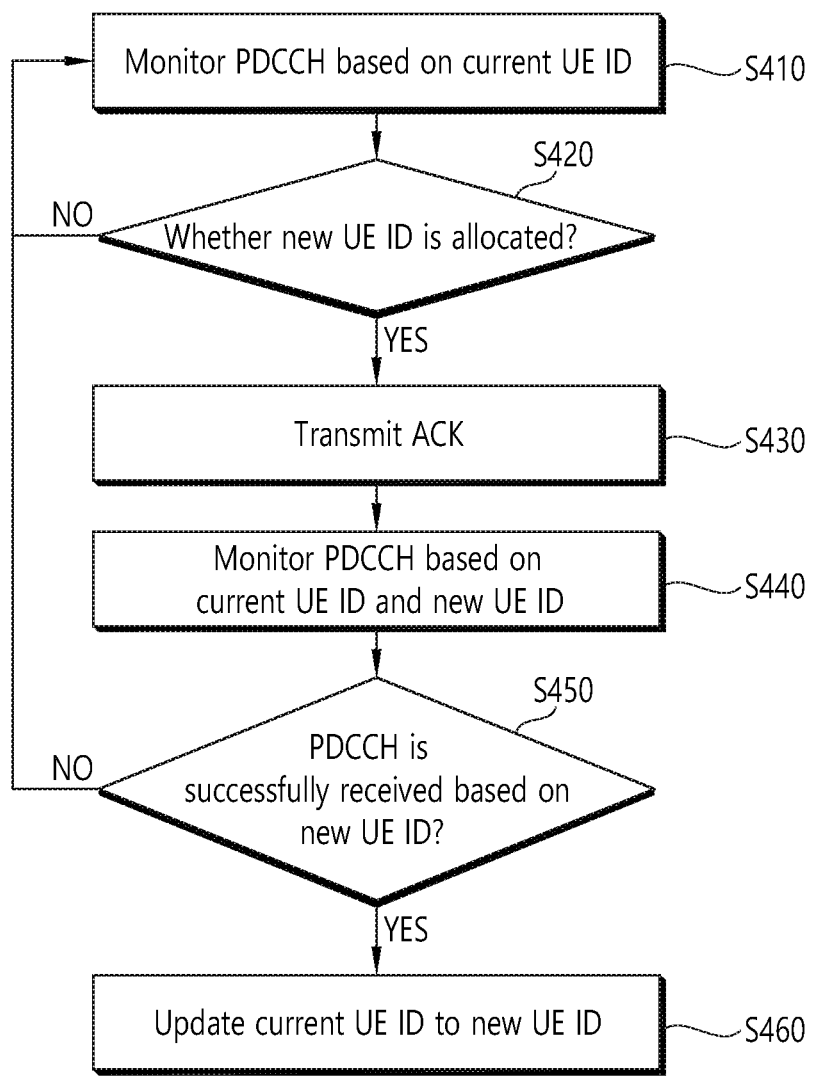
FIG. 4 shows an identifier switching method according to an embodiment of the present invention.

FIG. 4 shows an identifier switching method according to an embodiment of the present invention. A UE ID currently used by a wireless device is called a 'current UE ID', and a newly allocated UE ID is called a 'new UE ID'.

The wireless device monitors a PDCCH on the basis of the current UE ID (S410).

The wireless device determines whether the new UE ID is allocated (S420). The new UE ID may be received through DCI or MAC signaling. Information on the new UE ID itself may be included in the DCI, or information indicating switching to the new UE ID may be included in the DCI.

If information on allocation of the new UE ID is successfully received, the wireless device transmits hybrid automatic repeat request (HARQ) ACK (S430). A wireless resource used for transmission of the HARQ ACK may be acquired based on a PDCCH resource of DCI with allocation of the new UE ID.

The wireless device monitors the PDCCH based on both of the current UE ID and the new UE ID (S440). If UE ID switching is achieved for TRP switching, even if a UE ID switching command is successfully received from a source TRP, data transmission/reception with a target TRP may not be smoothly achieved. In order to avoid disconnection of network access of the UE during the UE ID switching, the UE may maintain data transmission/reception through the current UE ID and data transmission/reception through the new UE ID at the same time.

If a PDCCH and/or a PDSCH are successfully received based on the new UE ID within a give specific period of time (S450), the wireless device updates the current UE ID to the new UE ID (S460). A configuration of a physical channel may be updated according to the new UE ID. If the PDCCH is successfully received based on the new UE ID, the wireless device may transmit HARQ ACK to inform the source the TRP about the update of the UE ID. A wireless resource used in transmission of the HARQ ACK may be determined based on a wireless resource of a corresponding PDCCH.

If the PDCCH and/or the PDSCH are not successfully received based on the new UE ID within the given specific period of time, the wireless device interrupts PDCCH monitoring depending on the new UE ID.

The aforementioned UE ID switching scheme may be applied to at least any one of the long device identifier and the short device identifier. The long device identifier may change semi-statically through RRC signaling, whereas the short device identifier may change dynamically through DCI. If the wireless device fails in switching to the short device identifier, bits generated based on the long device identifier may be used as the short device identifier.

Now, switching of a TRP ID will be described.

If TRP ID switching is indicated through DCI or MAC signaling, a wireless device performs data transmission/reception by applying TRP specific information corresponding to a new TRP ID. The TRP specific information may include TRP specific physical layer configuration information such as a system bandwidth, a common search space, a PDSCH/PUSCH scrambling sequence, or the like. The TRP specific information may be transmitted periodically by each TRP. The wireless device may acquire the TRP specific information in advance from neighboring TRPs before the TRP ID switching is indicated.

The TRP ID may be acquired from a synchronization signal transmitted from each TRP, or may be acquired from radio resource management (RRM) measurement for each TRP and timing at which a reference signal is transmitted.

When the TRP ID switching is achieved because of a change of a TRP for a service, different UEs may collide due to the same UE ID. Therefore, a TRP switching command may be accompanied by a UE ID switching command. When the TRP ID changes, the wireless device may determine the UE ID on the basis of the changed TRP ID.

Figure 5:
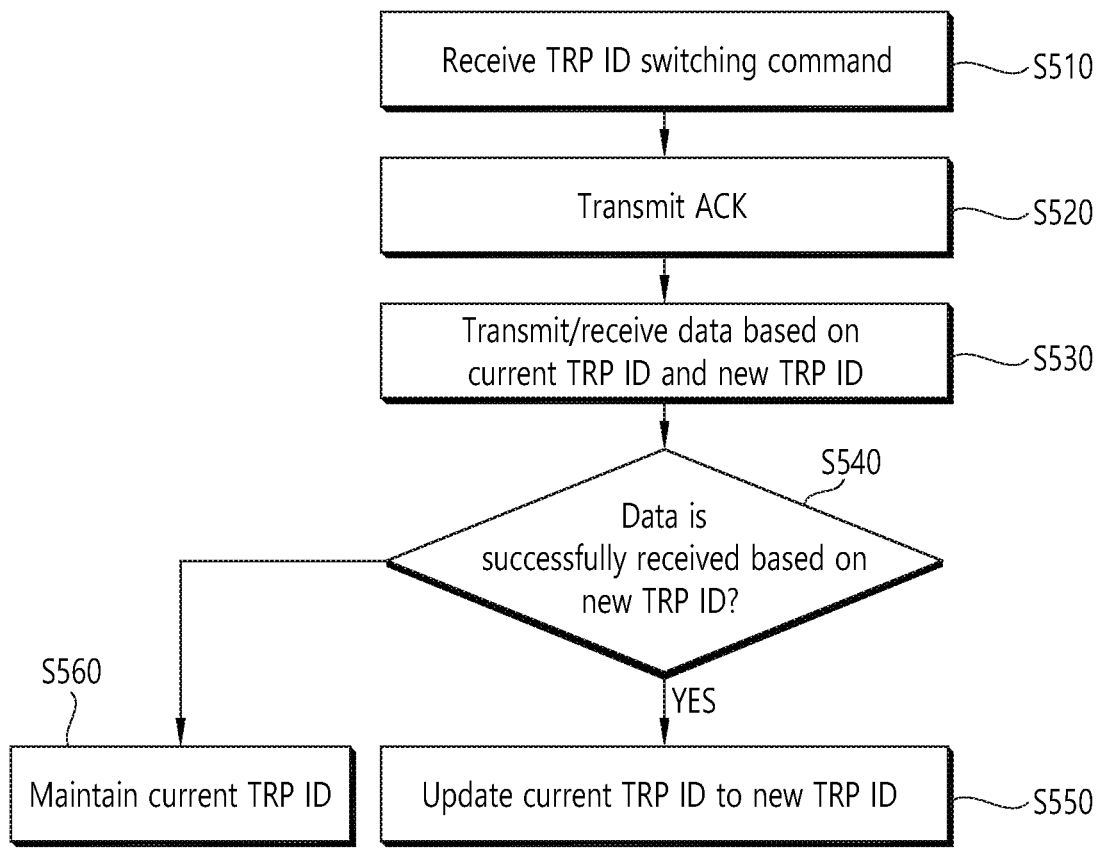
FIG. 5 shows an identifier switching method according to an embodiment of the present invention.

FIG. 5 shows an identifier switching method according to an embodiment of the present invention.

A wireless device receives a TRP ID switching command through DCI (S510). A TRP ID currently used by the wireless device is called a current TRP ID, and a TRP ID to be newly changed is called a 'new TRP ID'.

When the TRP ID switching command is successfully received, the wireless device transmits HARQ ACK (S520). A wireless resource used for transmission of the HARQ ACK may be acquired based on a PDCCH resource of DCI with the TRP ID switching command.

The wireless device transmits/receives data on the basis of both of the current TRP ID and the new TRP ID (S530). If TRP ID switching is achieved for TRP switching, even if a TRP ID switching command is successfully received from a source TRP, data transmission/reception with a target TRP may not be smoothly achieved. In order to avoid disconnection of network access of the UE during the TRP ID switching, the UE may maintain data transmission/reception through the current TRP ID and data transmission/reception through the new TRP ID at the same time. For example, the wireless device may attempt both of PDCCH detection generated based on the current TRP ID and PDCCH detection generated based on the new TRP ID.

If data (e.g., PDCCH or PDSCH) is successfully received based on the new TRP ID within a given specific period of time (S540), the wireless device updates the current TRP ID to the new TRP ID (S550). A configuration of a physical channel may be updated according to the new TRP ID. If the data is successfully received based on the new TRP ID, the wireless device may transmit HARQ ACK to inform the source the TRP about the update of the TRP ID. A wireless resource used in transmission of the HARQ ACK may be determined based on a wireless resource of a corresponding PDCCH.

If the data is not successfully received based on the new TRP ID within the given specific period of time, the wireless device maintains the current TRP ID (S560).

A plurality of TRP IDs may be allocated to the wireless device. For example, one current TRP ID and two new TRP IDs may be allocated. When data transmission/reception is performed for the plurality of TRP IDs in a TRP ID switching process, there is an increase in complexity of PDCCH detection and data reception. The following scheme is proposed to mitigate reception complexity of the wireless device.

First, a time point of receiving DL data such as DCI or the like may be restricted. The wireless device may receive DL data at a different time point (subframe or subframe set) for each of the plurality of TRP IDs. For the new TRP ID, the time point of receiving the DL data may be restricted.

Second, the number of PDCCH candidates may be restricted. The number of PDCCH candidates detected for each search space is predetermined. However, during the plurality of TRP IDs are maintained, the number of PDCCH candidates to be detected for each TRP ID by the wireless device may be decreased to be lower than a designated value. Alternatively, the number of PDCCH candidates may be decreased only for the new TRP ID. The number of PDCCH candidates to be detected for each TRP ID may be decreased with an increase in the number of TRP IDs. For example, assume that the number of PDCCH candidates of a specific search space is 6. If the number of TRP IDs is 2, the number of PDCCH candidates may be decreased to 4. If the number of TRP IDs is 3, the number of PDCCH candidates may be decreased to 2.

Third, a reception band or a DL data reception amount may be restricted. During the plurality of TRP IDs are maintained, a reception band of DL data received by the wireless device may be restricted to be less than or equal to a specific bandwidth. Alternatively, a maximum reception amount of DL data received by the wireless device may be restricted to be less than or equal to a specific bit size. This restriction may be applied only to a new TRP ID.

Fourth, device reception capability such as carrier aggregation (CA) capability, multiple input multiple output (MIMO) reception capability, interference cancellation capability, or the like may be restricted. During the plurality of TRP IDs are maintained, the number of carriers on which the wireless device can simultaneously receive DL data, the number of layers to be multiplexed, the number of reception signals of which interference cancellation is possible, or the like may be restricted to be less than or equal to a specific value. The reception capability restriction may be determined according to the number of TRP IDs simultaneously maintained by the wireless device.

Figure 6:
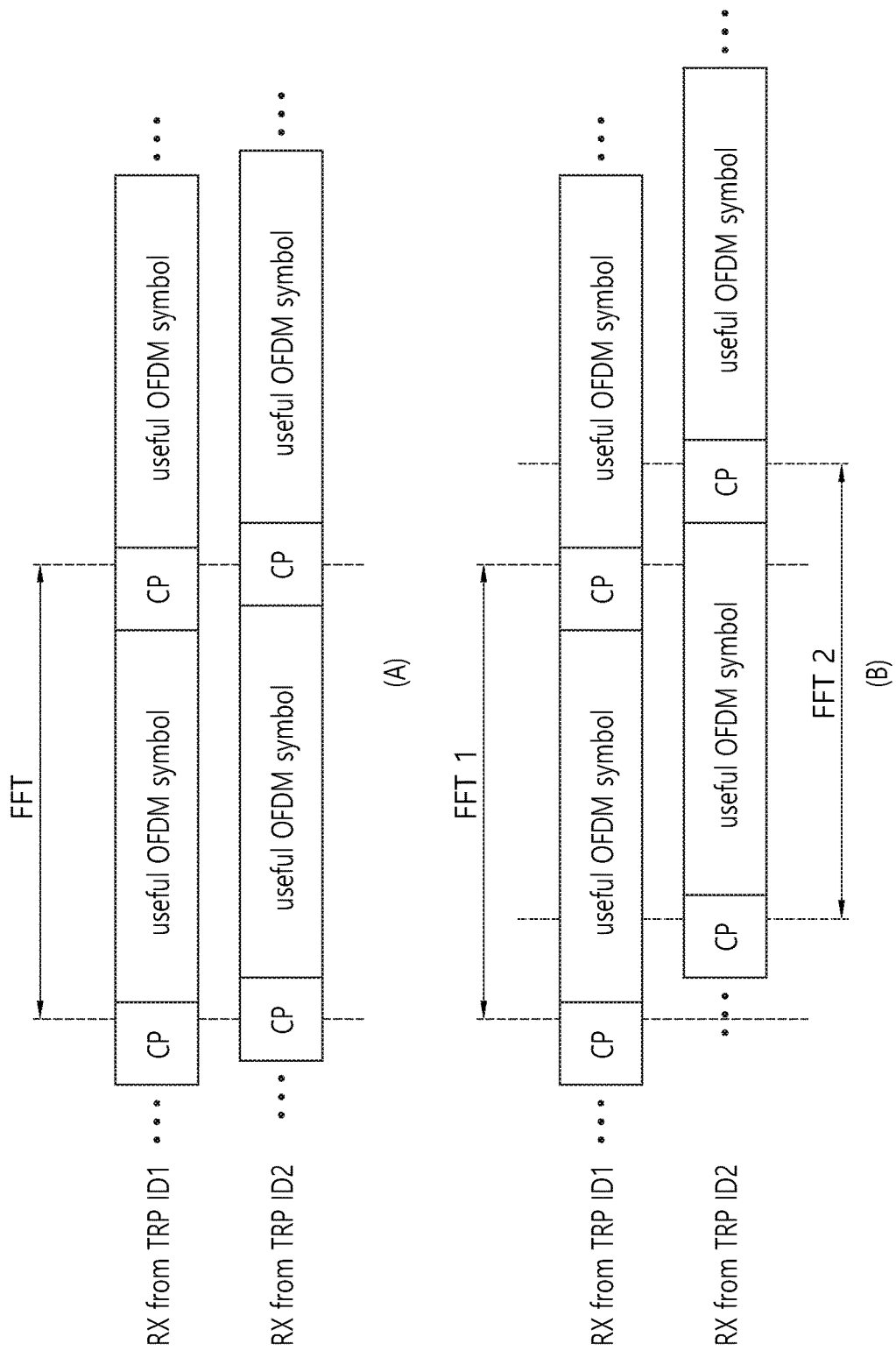
FIG. 6 shows various downlink (DL) synchronization situations.

FIG. 6 shows various DL synchronization situations. A scheme of mitigating reception complexity of a wireless device may be differently applied according to a DL synchronization situation between a plurality of TRPs.

A sub-figure (A) of FIG. 6 shows that DL reception timing of a plurality of TRPs is adjusted with a proper time margin within a cyclic prefix (CP) with respect to each orthogonal frequency division multiplexing (OFDM) symbol from a wireless device perspective. The wireless device may use identical frequency samples acquired through fast Fourier transform (FFT) performed one time to demodulate an OFDM symbol received from each TRP.

A sub-figure (B) of FIG. 6 shows a case where DL reception timing exceeds a CP range. The wireless device needs to perform an FFT process independent of each TRP.

When DL synchronization between the TRPs is adjusted within a specific level, a scheme of mitigating reception complexity may not be applied. Alternatively, a scheme of mitigating complexity of decoding, which is to be performed for each TRP after OFDM symbol demodulation, may be applied, such as restricting of the number of PDCCH candidates or restricting of a data reception amount. When the DL synchronization is not guaranteed, a scheme of decreasing an amount of process required for OFDM symbol demodulation per device may be applied, such as restricting of a reception band, restricting of the number of carriers, restricting of the number of signals of which interference can be cancelled.

When the wireless device maintains the plurality of TRP IDs as in the aforementioned schemes, only DCI detection may be performed for final TRP ID decision with respect to a new TRP ID. However, a scheme in which a UE receives data with respect to the plurality of TRP IDs may be considered as follows.

First, a plurality of TRPs transmit the same DL data with respect to the same HARQ process, but coding streams to be transmitted by different TRPs (i.e., a subset for the entire coding streams regarding DL data) may be different with respect to the same DL data. When DL grant DCI received from the plurality of TRP IDs simultaneously maintained is used to schedule DL data of the same HARQ process, the wireless device may attempt to decode DL data by integrating a corresponding coding stream received with respect to each TRP ID. Alternatively, the wireless device may attempt decoding for each coding stream received for the same HARQ process with respect to each TRP ID and may transfer only successfully decoded data to a higher layer of a physical layer.

Second, for the same HARQ process, different TRPs may transmit independent DL data. The wireless device may attempt decoding for each coding stream received for the same HARQ process, and may transfer a corresponding HARQ process number and a TRP ID together to the higher layer of the physical layer with respect to successfully decoded data.

Figure 7:
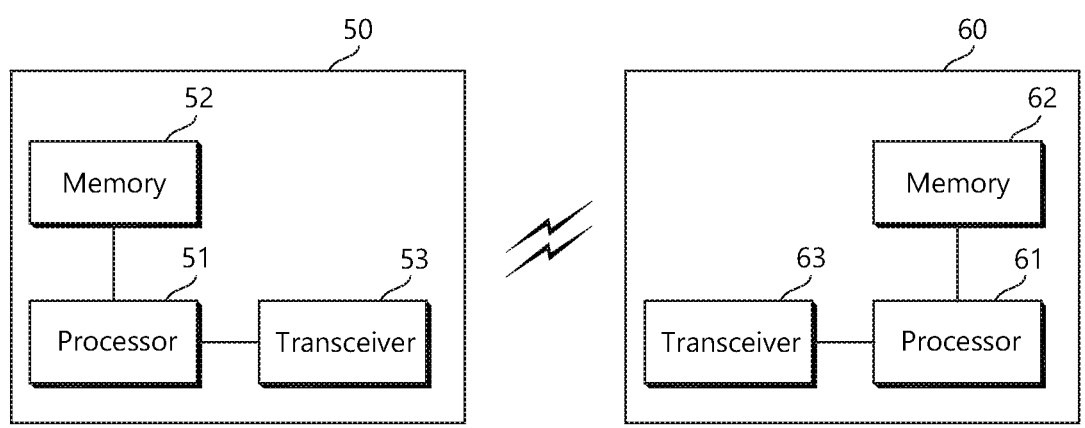
FIG. 7 is a block diagram showing a wireless communication system according to an embodiment of the present invention.

FIG. 7 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of a TRP may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of monitoring a control channel by a wireless device in a wireless communication system, the method comprising:
    configuring a search space for detecting a physical downlink control channel (PDCCH) based on a first device identifier; and
    monitoring the PDCCH in the search space based on a cyclic redundancy check (CRC) demasking of downlink control information (DCI) in the PDCCH using a second device identifier,
    wherein the first device identifier is a part of at least one of International Mobile Subscriber Identity (IMSI), Temporary Mobile Subscriber Identity (TMSI), and/or Public Land Mobile Network Identifier (PLMN ID), and
    wherein the first device identifier includes the second device identifier.

2. The method of claim 1, wherein a number of bits of the first device identifier is greater than a number of bits of the second device identifier.

3. The method of claim 1, wherein the PDCCH includes an uplink (UL) grant for UL scheduling.

4. The method of claim 3, further comprising:
    transmitting UL data by using the UL grant,
    wherein the UL data is scrambled with a scramble sequence generated based on the long first device identifier.

5. The method of claim 1, further comprising:
    receiving information related to the second device identifier, wherein the first device identifier is generated based on the second device identifier.

6. The method of claim 1, further comprising:
receiving information related to the first device identifier, wherein the second device identifier is generated based on the first device identifier.

7. The method of claim 1, wherein the PDCCH includes a command for informing transmission/reception point (TRP) switching from a source TRP to a target TRP.

8. A device for monitoring a control channel in a wireless communication system, the device comprising:
a transceiver configured to transmit and receive a radio signal; and
a processor operatively coupled to the transceiver and configured to:
configure a search space for detecting a physical downlink control channel (PDCCH) based on a first device identifier; and
monitor the PDCCH in the search space through the transceiver based on a cyclic redundancy check (CRC) demasking of downlink control information (DCI) in the PDCCH using a second device identifier,
wherein the first device identifier is a part of at least one of International Mobile Subscriber Identity (IMSI), Temporary Mobile Subscriber Identity (TMSI), and/or Public Land Mobile Network Identifier (PLMN ID), and
wherein the first device identifier includes the second device identifier.

9. The device of claim 8, wherein a number of bits of the first device identifier is greater than a number of bits of the second device identifier.

10. The device of claim 8, wherein the PDCCH includes an uplink (UL) grant for UL scheduling.

11. The device of claim 10,
wherein the processor is configured to transmit UL data through the transceiver by using the UL grant, and
wherein the UL data is scrambled with a scramble sequence generated based on the first device identifier.

* * * * *